(12) United States Patent
Edwards et al.

(10) Patent No.: US 9,370,742 B2
(45) Date of Patent: Jun. 21, 2016

(54) RADIAL PLEAT DESIGN AND COLLAPSIBLE FILTER ELEMENT

(71) Applicant: BHA Altair, LLC, Franklin, TN (US)

(72) Inventors: Sarah Adele Edwards, Kansas City, MO (US); Martin Gregory Hatfield, Odessa, MO (US); Nusrat Farzana, Lees Summit, MO (US)

(73) Assignee: BHA Altair, LLC, Franklin, TN (US)

( * ) Notice: Subject to any disclaimer, the term of this patent is extended or adjusted under 35 U.S.C. 154(b) by 62 days.

(21) Appl. No.: 13/836,441

(22) Filed: Mar. 15, 2013

(65) Prior Publication Data

US 2014/0260138 A1    Sep. 18, 2014

(51) Int. Cl.
*B01D 46/00* (2006.01)
*B01D 46/52* (2006.01)
*B01D 46/24* (2006.01)

(52) U.S. Cl.
CPC .......... *B01D 46/523* (2013.01); *B01D 46/0001* (2013.01); *B01D 46/0021* (2013.01); *B01D 46/2411* (2013.01); *B01D 46/522* (2013.01); *B01D 2275/207* (2013.01); *Y10T 29/49826* (2015.01)

(58) Field of Classification Search
CPC ........ B01D 46/19; B01D 46/21; B01D 46/46; B01D 46/521; B01D 46/523; B01D 46/528
USPC ................... 55/374, 483, 493, 496, 500, 482; 210/496, 493.1–493.5, 342, 338; 29/428
See application file for complete search history.

(56) References Cited

U.S. PATENT DOCUMENTS

| | | | |
|---|---|---|---|
| 4,594,162 A | 6/1986 | Berger | |
| 4,842,739 A | 6/1989 | Tang | |
| 4,936,991 A | 6/1990 | Peyton et al. | |
| 6,726,751 B2 | 4/2004 | Bause et al. | |
| 7,922,006 B2* | 4/2011 | Fall et al. | 210/493.1 |
| 7,959,699 B2 | 6/2011 | Privitt et al. | |
| 2004/0103626 A1 | 6/2004 | Warth et al. | |
| 2006/0090431 A1* | 5/2006 | Brown | 55/482 |
| 2008/0264854 A1* | 10/2008 | Hartmann et al. | 210/496 |
| 2011/0265434 A1 | 11/2011 | Polizzi et al. | |
| 2011/0290116 A1 | 12/2011 | Jarrier | |
| 2012/0110963 A1* | 5/2012 | Jarrier | 55/374 |

* cited by examiner

*Primary Examiner* — Jason M Greene
*Assistant Examiner* — Karla Hawkins
(74) *Attorney, Agent, or Firm* — Reinhart Boerner Van Deuren P.C.

(57) ABSTRACT

A filter element for filtering a fluid flowing through the filter element. The filter element includes a pleat pack that extends about an axis and that has an internal volume. The pleat pack includes a filter media for filtering out particulate from the fluid. The filter media is pleated. The pleats extend out along planes that are transverse to the axis. An associated method of providing a filter element that filters a fluid flowing through the filter element is provided.

28 Claims, 5 Drawing Sheets

RADIAL PLEAT DESIGN AND COLLAPSIBLE FILTER ELEMENT

BACKGROUND OF THE INVENTION

1. Field of the Invention

The invention relates to a filter element, and specifically relates to a filter element with a pleat pack.

2. Discussion of Prior Art

Filter elements can be used to provide clean fluid, such as air, to or from various devices. Such devices can include gas turbines where clean air over a long service life of the gas turbine is needed. Filter elements such as cartridge filters can be used within an inlet filter house to filter contaminants from an air flow prior to introduction into an associated gas turbine.

Many filter elements include filter media that is pleated in a longitudinal direction. Specifically, such longitudinal pleating extends parallel to an elongate axis of the filter elements. For gas turbine pulse filters, such filters are commonly termed cone and cylinder. Filter elements having longitudinal pleating are often fixed in at least one size dimension such as the length dimension. Furthermore, longitudinal pleating also creates shelf-like obstructions that can limit or hinder the release of filtered particulate matter from the filter media. Additionally, many longitudinally-pleated filter media are in contact with other structures in an end-to-face orientation such that the edge of the filter media is sealed to a surface via a required use of relatively large amounts of sealant to create an effective seal. Also, longitudinally-pleated filter media can be limited in the total area of filter media included within a particular filter size as well as the spacing between the pleats within a given filter element. As such, there are benefits for continual improvements in filter technologies so as to address these and other issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a filter element for filtering a fluid flowing through the filter element. The filter element includes a pleat pack that extends about an axis and that has an internal volume. The pleat pack includes a filter media for filtering out particulate from the fluid. The filter media is pleated. The pleats extend out along planes that are transverse to the axis.

In accordance with one aspect, the present invention provides a method of providing a filter element that filters a fluid flowing through the filter element. The method includes providing a pleat pack to extend about an axis and to have an internal volume. The pleat pack includes a filter media for filtering out particulate from the fluid. The step of providing the pleat pack includes providing the filter media to have pleats with the pleats extend out along planes that are transverse to the axis.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Example embodiments that incorporate one or more aspects of the invention are described below and illustrated in the drawings. These illustrated examples are not intended to be a limitation on the invention. For example, one or more aspects of the invention can be utilized in other embodiments and even with other types of devices. Moreover, certain terminology is used herein for convenience only and is not to be taken as a limitation on the invention. Still further, in the drawings, the same reference numerals are employed for designating the same elements.

Figure 1:
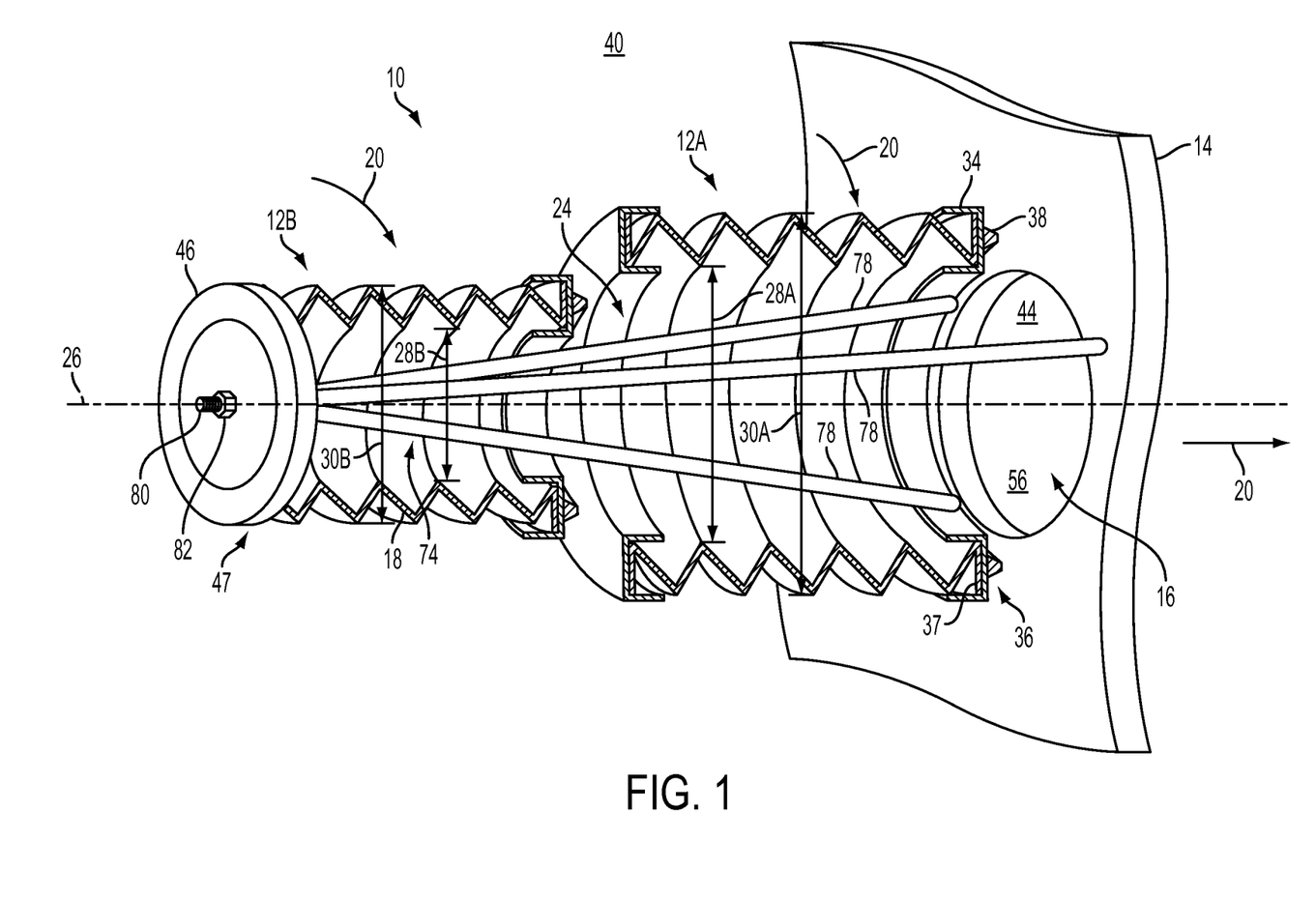
FIG. 1 is a schematized, perspective view, partially torn away, of an example filter element mounted to a tube sheet in accordance with at least one aspect of the present invention.

FIG. 1 illustrates a first example filter element 10 for filtering a fluid flowing through the filter element. The filter element 10 includes at least one pleat pack 12. Each pleat pack 12 is configured for filtering fluid, such as air and/or gas. The fluid (e.g. air) can be proceeding toward a turbine (not shown), such as a gas turbine. For such an example, the filter element is filtering the fluid (e.g., air) to be used by the turbine. It is to be appreciated that the fluid may be filtered for other fluid utilizing devices. Also, the filter element 10 may be used to filter fluid (e.g., exhaust gas) before the fluid is released to atmosphere. As such, it is to be appreciated that the specific arrangement for which the filter element 10 is utilized need not be a specific limitation upon the present invention.

Further, within the illustrated example of FIG. 1, the filter element 10 is shown mounted to a tube sheet 14 that is part of an inlet filter house that is upstream of the turbine. The tube sheet 14 can be constructed of any suitable material, such as sheet metal. The filter element 10 is associated with a passageway aperture 16 through the tube sheet 14 as will be appreciated. It is contemplated that plural, adjacent filter elements 10 (only one shown) may be mounted upon the same tube sheet 14 within the inlet filter housing. Each of the plural filter elements 10 is associated with a respective passageway aperture through the tube sheet 14 as will be appreciated. The plurality of filter elements 10 can be considered to be an array.

Focusing attention back to the shown example within FIG. 1, the example filter element 10 includes two pleat packs 12A and 12B, which are adjacently located to each other. It is to be appreciated that the number of pleat packs 12A, 12B within the filter element 10 can be varied to be any other number of pleat packs 12 (e.g., one or more than two). Additionally, it is to be appreciated that the example pleat packs 12A, 12B shown within FIG. 1 are different from one another. Of course, the amount of differenced or similarity between the pleat packs 12A, 12B within the filter element 10 can be varied. Herein the pleat packs 12A, 12B are sometimes generically/commonly discussed to the extent that the pleat packs are identical/similar. With such generic/common discussion, it is to be appreciated that the provided discussion is applicable to both pleat packs 12A, 12B within the presented example. Also within such generic/common discussion, the pleat pack(s) may be identified by a generic reference numeral 12. The two pleat packs 12A, 12B are discussed specifically/individually as specific need arises, and accordingly identified by the specific reference numerals 12A and 12B, respectively.

Each pleat pack 12 includes a filter media 18. The filter media 18 is configured to block particulate, including but not limited to dust, from the fluid flow (represented by arrows 20) flowing through the filter element 10. As such, filter media 18 filters particulate from the fluid. The filter media 18 can be formed from a variety of materials, such as fibers or a membrane. In one example, the filter media 18 is composed of a nonwoven porous synthetic material and/or cellulose. In one example, the filter media 18 includes a single layer of material. In another example, the filter media 18 can include a single layer of material with a coating. The filter media 18 for an individual pleat pack 12 can be made from a single, continuous piece of material, or the filter media 18 can include a seam. Such a seam can be created by any suitable operation including, but not limited to, adhesive bonding, thermal bonding, and ultrasonic bonding. Of course, one or more aspects of the filter media 18, such as material, construction, configuration, thickness, etc. can be varied and thus need not be specific limitations upon the present invention. For example, the pleat spacing along the axis may be varied, which is generally shown in the drawings to at least some level. As another example, the pleat corrugation is varied, which is generally shown in the drawings to at least some level. Also, the seam could be vertical creating one long pleated tube or can be a series of connect discs. Another method to create would be to pleat groups of media. For example, create a radial pleat pack of a plurality of pleats and seam these smaller portions to create the entire filter. It is to be appreciated that the method of manufacture need not be a specific limitation upon all aspects of the present invention.

The filter media 18 has a generally annular configuration. In an operative state, the filter media 18 bounds an internal volume 24. Flow of fluid (e.g., represented by the arrowhead 20) that proceeds through the filter media 18 also flows (e.g., moves) through the internal volume 24. In the operative state, the filter media 18 of the pleat pack 12 is positioned/elongated along an elongate axis 26. Also, the filter media 18 extending about the axis 26. Specifically, the filter media 18 extends, annularly, about the axis 26, with the axis 26 extending along the internal volume 24. Thus, the filter media 18 can be considered to be roughly cylindrical about the elongate axis 26 and the internal volume 24 can be considered to be roughly a cylinder oriented generally along the elongate axis 26.

As shown in FIG. 1, the filter media 18 is folded to have pleats that extend annularly about the elongate axis 26. Thus, the pleats extend out along planes that are transverse to the elongate axis 26. This pleating arrangement is termed a "radial pleat design" and has an accordion-like configuration. The radial pleat design forms an inside diameter (e.g., 28A) and an outside diameter (e.g., 30A) wherein the difference between the outside diameter and the inside diameter is a pleat height. Within one aspect, the pleat height is not constricted to be the same throughout the filter. Advantages for compression or performance may be seen by varying this height. One example would be to have a tall-short-tall height pattern so that every other pleat nests inside the latter thus reducing total filter compression further. There could also be a pleat height gradient (e.g. going from tall to short to create a generally conical shaped filter). Similarly the corrugation height can be controlled so that the filter naturally forms into a tapered shape.

Within the shown example of FIG. 1, the outside diameter 28A of the first pleat pack 12A is greater than the outside diameter 28B of the second pleat pack 12B. In one example (e.g., the first pleat pack 12A), the filter media 18 has an outside diameter of 16.5 inches and has a pleat height of about 1.88 inches. This combination of dimensions yields a ratio of the outside diameter 30 of the filter media 18 to the pleat height of about 8.8:1. In another example (e.g., the second pleat pack 12B), the filter media 18 has an outside diameter of 12.75 inches and has a pleat height of about 1.88 inches. This combination of dimensions yields a ratio of the outside diameter 30 of the filter media 18 to the pleat height of about 6.8:1. In the shown example of FIG. 1, which containing the two pleat packs 12A, 12B, the overall filter element 10 can be considered to generally mimic a known filter style that has a cone-shaped section with a larger end adjacent to a tube sheet and a smaller diameter cylindrical-shaped section distal from such a tube sheet.

It should be noted that the filter element 10 can be mounted in an application, such as the inlet filter house, such that the elongate axis 26 is substantially horizontal. Persons having skill in the art will appreciate that other filter elements that have filter media with longitudinal pleats would tend to create pleating "shelves" that can be resistant to releasing particulate matter such as dust. However, the radial pleat design as described herein includes at least 50% of the filter media 18 providing significantly less physical barriers in a substantially vertical direction. Thus, forces including, but not limited to, gravity or reverse pulse cleaning can release filtered particulate matter away from the filter media 18, thereby improving the filtration performance of the filter element 10.

Turning back to the example filter element 10, the filter element includes an annular, ring-shaped end pan 34 at a proximal end 36 of one of the pleat packs 12 nearest to the tube sheet 14. Within the shown example of FIG. 1, the end pan 34 is at the proximal end of the first pleat pack 12A. The end pan 34 can cover/envelope an end 37 of the filter media 18. A sealant material is be located at the end 37 of the filter media 18 and the end pan 34 to secure the last pleat to the end pan 34. It is to be appreciated that the radial pleat design allows a face or surface of the end 37 of the filter media 18 to lie in contact with a surface of the end pan 34. This mode of face-to-face contact enables a large amount if surface to surface contact and also enables less sealant to be used between the filter media 18 and the end pan 34 in comparison to some filter elements having filter media pleated in a longitudinal pattern. As one can appreciate, a prior longitudinal pleating pattern of other filter elements typically would only present an edge of a filter media to an end pan, providing some greater difficulty in sealing such filter media to such an end pan. Accordingly, such prior approaches to sealing such prior longitudinal pleating pattern filter media to such an end pan have included applying relatively large amounts of sealant. However, in the presented example and in accordance with an aspect of the present invention, the face-to-face orientation of the filter media 18 to the end pan 34 enables a reliable seal with less required sealant. An optional seal 38 can be mounted to the end pan 34 to help seal the pleat pack 12 to the tube sheet 14 and thus help prevent fluid (e.g., air) bypassing the filter element 10. Accordingly, the face-to-face sealed interface between the filter media 18 and the end pan 34 and the optional seal 38 help prevent fluid bypass from a dirty side 40 (upstream) and a clean side 44 (downstream).

As shown within FIG. 1, the end of the first pleat pack 12A and also the annular, ring-shaped end pan 34 are located adjacent to the aperture 16 through the tube sheet 14. Thus the internal volume 24 within the pleat pack (e.g., 12A) is in direct fluid communication within the aperture 16 and thus the clean side 44 of the tube sheet 14. Accordingly, the last annular pleat is at the fluid exit of the pleat pack 12A.

The filter element 10 can also include an end cap 46 located on a distal end 47 of the filter element 10. In the shown example, the end cap 46 is at the distal end of the second pleat pack 12B. Similar to the end pan 34, the end cap 46 can cover an end of the filter media 18, and a sealant material can be located between the filter media 18 and the end cap 46. It is to be appreciated that the radial pleat design allows a face or surface of the filter media 18 to lay in contact with an interior surface of the end cap 46. This mode of face-to-face contact enables a relatively large amount of surface contact and also enables obtaining a seal with relatively less sealant used between the filter media 18 and the end cap 46 in comparison to some filter elements as previously described. Accordingly, the face-to-face sealed interface between the filter media 18 and the end cap 46 helps prevent fluid bypassing the filter media 18 of the filter element 10 from the dirty side 40 to the clean side 44.

As mentioned, the filter element 10 of the presented example of FIG. 1 includes the two pleat packs 12A and 12B, which are adjacently located to each other. Also, as mentioned, within the shown example of FIG. 1, the outside diameter 28A of the first pleat pack 12A is greater than the outside diameter 28B of the second pleat pack 12B. Within the shown example, a junction is provided between the first pleat pack 12A and the second pleat pack 12B. Specifically, another annular, ring-shaped end pan is located at the distal end of the first pleat pack 12A, which is away from the tube sheet 14. Similar to the end pan 34, the distally located end pan covers an end of the filter media 18, and a sealant material can be located between the filter media 18 and the end pan.

Also, yet another annular, ring-shaped end pan is located at the adjacent end (i.e., end closest to the tube sheet 14) of the second pleat pack 12B. Similar to the end pan 34, the end pan for the second pleat pack 12B covers an end of the filter media 18, and a sealant material can be located between the filter media 18 and the end pan. Within the shown example, an optional seal can be mounted to the end pan for the second pleat pack 12B to help seal the second pleat pack 12 to the first pleat pack. Still further, additional structure/components may be provided to couple the two abutting end pans together and thus couple the two pleat packs 12 together. Accordingly, the face-to-face sealed interfaces at each filter media 18 and the respective end pans, the optional seal 38 and any additional structure/components that may be provided to couple the two abutting end pans together thus help prevent fluid (e.g., air) bypass from the dirty side 40 to a clean side 44.

Of course, as shown within FIG. 1, the annular, ring-shaped end pan 34 is located adjacent to the aperture 16 through the tube sheet 14. Thus the internal volume 24 within the pleat pack (e.g., 12A) is in direct fluid communication within the aperture 16 and thus the clean side 44 of the tube sheet 14. Also, as can be appreciated upon viewing FIG. 1, both of the end pans at the pleat pack junction have opposing openings that allows direct fluid communication between their respective internal volumes and ultimately fluid communication with the tube sheet aperture 16 and the clean side 44. So, it is to be appreciated that during a filtering operation, exterior surfaces 54 of the pleat packs 12 serve as the airflow inlet for the filter element 10. The open end of the first pleat pack 12A (i.e., nearest the tube sheet 14) abuts the respective aperture 16 through the tube sheet 14 and serves as a filter element outlet 56.

Turning to the aspect of securing the filter element 10 to the tube sheet, it is contemplated that any suitable means can be used to support/secure the filter element 10 to the tube sheet 14. Also, as mentioned, in an operative state, the pleat packs 12 of the filter element 10 are elongated along the axis 26. Returning focus to the example shown within FIG. 1, an internal tripod structure 74 is provided and is secured (e.g., via welding, bolting or the like) to the tube sheet 14 as part of example means to support/secure the filter element 10 to the tube sheet 14. Also, the internal tripod structure 74 can be an example means to retain the pleat packs of the filter element elongated along the axis 26. The tripod structure 74 includes legs 78 that are secured to the tube sheet 14 adjacent to the aperture 16 and extend away from the tube sheet. The legs 78 converge radially inwardly as the legs extend away from the tube sheet 14. At a convergence point of the legs, the tripod structure 74 has a gasketed, threaded rod 80 extending further away from the tube sheet 14. A hole (not visible in FIG. 1) in the end cap 46 permits extension of the threaded rod 80 therethrough. Mating hardware 82, such as a wing nut, locking nut, etc. can be engaged to the threaded rod 80.

With the tripod structure 74 extending through the two pleat packs 12, the threaded rod 80 extending through the end cap 46 and with the mating hardware 82 secured to the threaded rod, the filter element 10 is kept in a desired elongated state and in a particular location against the tube sheet 14. It is to be appreciated that the internal tripod structure 74 can provide a framework counteracting the forces of the fluid flow 20 that tend to collapse the filter element 10 and/or the filter media 18. Interaction between the threaded rod 80 and the mating hardware 82 can also be used to apply a force to the filter element 10 in a direction generally perpendicular to the tube sheet 14. This force can be used to at least partially compress the seal 38 between the filter element 10 and the tube sheet 14. The seal 38 helps provide a barrier between the dirty side 40 (upstream) and a clean side 44 (downstream) of the air flow. Airflow direction can go either way. 40 could be upstream with 44 downstream or 40 could be downstream and 44 could be upstream similar to how a bag filter operates.

It is to be appreciated that the example presented within FIG. 1 can be modified in several ways. One possibility is that the second pleat pack could be sized and/or configured to telescope within the first pleat pack. For such a possibility, it is to be appreciated that the outside diameter 88 of the second pleat pack would to be less than the inside diameter 28 of the first pleat pack. In such an example, the second pleat pack 84 might exclude the use of the end pan 34 and seal 38. Along these same lines, seals, such as seals between adjacent filters, could be optional. Also such an example might include the aspect of the end of the filter media 18 of the second pleat pack being bonded or sealed to the filter media 18 of the first pleat pack in order to prevent fluid (e.g., air) bypass. The two filter media 18 can be bonded or sealed by methods such as adhesive bonding, thermal bonding, and ultrasonic bonding or any other suitable attachment methods. It is to be appreciated that such a possible example filter element 10 provides the benefit of including two pleat packs 12 that can be positioned into a collapsed state (best seen in FIG. 2) that telescope into each other, thereby further reducing the space requirements in comparison to a filter element 10 that was the length of the two pleat packs 12 and did not include telescoping sections. This feature could improve the reduction of space requirements for the filter element 10 during shipping, storage, etc. In one aspect, two elements that can be collapsed and/or telescoped together can be referred to as a set and thus considered as a single item (e.g., single filter).

Figure 2:
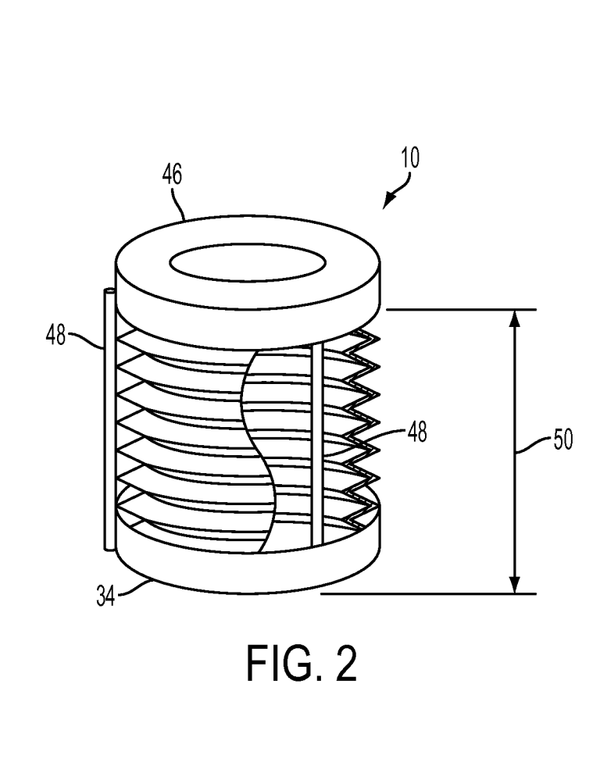
FIG. 2 is a schematized, perspective view, partially torn away, of another example filter element including attachable support elements in accordance with at least another aspect of the present invention.

Turning now to FIG. 2, some possible variations to the filter element 10 are presented. For example, the shown filter element 10 of FIG. 2 includes just one pleat pack. Associated with this example variation, the filter element has just one end pan 34, with the end pan 34 and the end cap 46 being secured to the single pleat pack. Variations are of course possible and contemplated. One example variation includes two open pans. Further variations are possible in view of the possibly of combined elements into a set.

Also, within FIG. 2 another example variation is that the filter element 10 can further include at least one attachable support element 48 configured to maintain a distance between the end pan 34 and the end cap 46 such that the filter element 10 has a retained length 50 (e.g., held at a constant distance value). In one specific example, the support element 48 is fixed in length, thereby maintaining the distance of length 50 without change. Any suitable support element 48 can be used including a rod, such as that shown in FIG. 2 which can be located within the internal volume (see similar volume 24 in FIG. 1). Turning specifically to the example of FIG. 2, one rod is shown within the internal volume. Alternatively, the location can be in the space exterior to the internal volume (one rod shown in FIG. 2 at the space exterior). It is to be appreciated that a plurality (e.g., two shown) of support elements 48 can also be used and that location of the support elements 48 can alternate between the internal volume and the space exterior to the internal volume. The attachable support element(s) 48 can have any length. Such length can be associated with a collapsed state, a somewhat collapsed state or a state considered to be elongated. The attachable aspect of the support element(s) 48 can also be considered to be removable.

Other examples of a support structure are contemplated. One further example includes a perforated structures such as expanded metal that at least partially surround the exterior of the filter media 18 where the exterior is defined by the outside diameter 30. Alternatively, the perforated structure can at least partially surround the interior of the filter media 18 where the interior is defined by the inside diameter 28. Another example of a support structure includes a combination of expanded metal components that can surround the interior and the exterior of the filter media 18. See for example FIG. 4.

Figure 3:
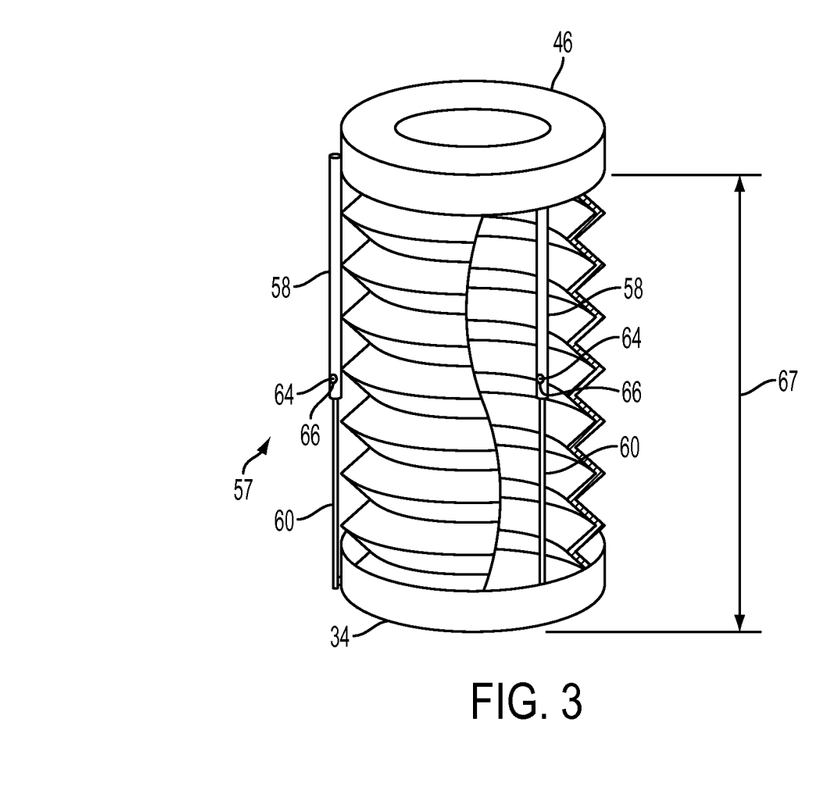
FIG. 3 is a schematized, perspective view, partially torn away, of another example filter element including extendible poles view in accordance with at least another aspect of the present invention.

In another aspect, the filter element 10 can be configured to be selectively positioned between a state at or somewhat collapsed as shown generally in FIG. 2 and state considered to be elongated as shown generally in FIG. 3. In other words, the axial length is variable. As can be appreciated, the radial pleat design enables the filter element 10 and/or individual pleat packs 12 to be placed into a collapsed state promoting more efficient storage, shipping, and other operations. So, for each pleat pack 12, the axial length is variable. It is to be appreciated that the change in length is associated within an accordion-like movement. In order, to provide for variation of the state of elongation, one aspect of the present invention is to provide for the support elements 48 to have variable length.

As shown in FIG. 3, in one example of the variable length aspect, an attachable support element such as one or more extendable poles 57 is provided. As can be appreciated, the extendable pole(s) 57 can be adjusted. In a comparison to the structures presented within FIG. 2, the extendable pole(s) 57 are in place of the support element(s) 48. In one specific example, each extendable pole 57 includes a first rod 58 and a second rod 60. The second rod 60 is configured to be slidably engaged with the first rod 58 such that the second rod 60 can telescope into and out of first rod 58. In a more particular example, the second rod 60 can include a push button 64 that cooperates with an aperture 66 in the first rod 58. When the second rod 60 is located primarily within the first rod 58, the push button is compressed so that the rods 58, 60 can be in sliding engagement. As the second rod 60 is telescoped out from the first rod 58, the rods 58, 60 reach a position where the push button is able to extend so that at least a portion of the push button 64 protrudes through the aperture 66. This engagement between the push button 64 and the aperture 66 limits or eliminates further telescoping between the rods 58, 60. This position can represent a fully elongated state of the filter element 10, such as selected for optimal filtration performance. The telescoping rods 58, 60 can be similar in construction to some extending tent poles, used to erect camping tents. It is to be appreciated that the extendable pole(s) 57 can be located within the internal volume 24, or in the space exterior to the internal volume 24. It is to be appreciated that a plurality of extendable pole(s) 57 can also be used and that location of the extendable pole(s) 57 can alternate between the internal volume 24 and the space exterior to the internal volume 24.

While in the collapsed state, the filter element 10 has a first distance of length (e.g., similar to the length 50 as shown in FIG. 2), if an operator so chooses to place the filter element 10 into the elongated state (e.g., similar to the length 67 as shown in FIG. 3), such as in preparation for mounting onto a tube sheet 14 (best seen in FIG. 1), the operator can grasp the filter element 10 with an end pan 34 in one hand and the end cap 46 in the other hand and pull the ends apart until the push button(s) 64 snap into place in the apertures 66 when the filter element 10 has a second distance of length 67 as shown in FIG. 3. To place the filter element 10 back into the collapsed state, an operator can depress the push button(s) 64 and apply a force on at least one of the end pan 34 and the end cap 46 in order to telescope the second rod 60 into the first rod 58.

Another method to create a collapsible filter is to have a spring or helical structure with media fixed on either the outside or inside of the collapsible core. A helical structure has the potential to be viable for manufacture. If a spring or a spring like structure is used as the core, the spring will have a known compression ratio in one example. The filter can be locked in place and released once installed thereby creating an alternate collapsing mechanism.

Another method could be to not have any mechanism attached to the filter itself, but have some kind of hook that attaches to the tubesheet fixing it in place once installed. Such would be an example of an arrangement in which tension might be applied. Such could allow for the media to flex if pulsed with a blast of compressed air during a self-cleaning filter application. The flexing may potentially aid in dust release.

If filter is to be shipped and installed in the same form (i.e., not collapsible) the pleat spacing may need to be controlled. A pleat-lock could be utilized; this is when a portion of the pleat tip is wider than the majority of the tip. A glue bead could be applied on the upstream and/or downstream side of the media holding the pleats in space. Another method would be to apply a thermoplastic or thermoset polymer along the length of the filter/perpendicular to the pleat tips fixing them in place. A metal wire(s) could be installed along the length of the filter/perpendicular to the pleat tips to keep them separate. Open mesh circular discs could also be fixed inside the filter giving rigidity and pleat spacing.

Figure 4:
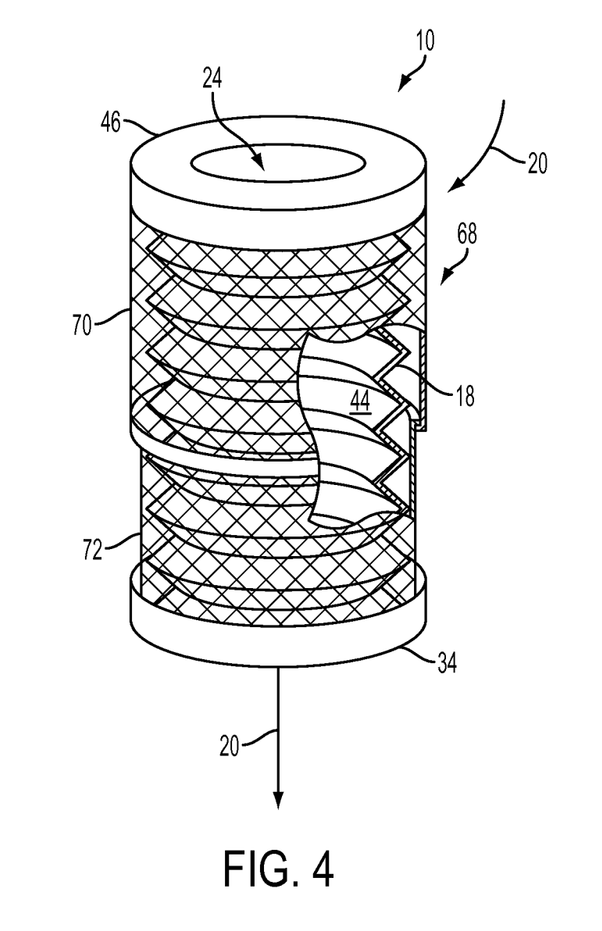
FIG. 4 is a schematized, perspective view, partially torn away, of another example filter element including a telescoping cage structure in accordance with at least another aspect of the present invention.

Tuning to FIG. 4, another example filter element 10 can include a telescoping cage structure 68 as an example of an attachable and adjustable support element. Within the shown example the cage structure is an external cage. However, the cage could be internal. Still further, cages may be provided partially externally (i.e., for one portion) and partially internally (e.g., for another portion), or both internally and externally for all portions.

The telescoping cage structure 68 can include a first section 70 and a second section 72 that can be relatively displaced to position the filter element 10 into the elongated state. The first section 70 can have an inside diameter that is slightly larger than the outside diameter of the second section 72 so that the second section 72 can be slidably engaged with the first section 70 by telescoping into and out of first section 70. Each of the first and second sections 70, 72 can be formed of expanded metal materials that surround the exterior of the filter media 18. While not shown in FIG. 4, the first and second sections 70, 72 can include structure that enables the first and second sections 70, 72 to reduce or eliminate telescoping movement once the filter element 10 has reached its designed elongated state. It is to be appreciated that the telescoping cage structure 68 can provide firm support to resist fluid flow 20 forces that tend to collapse the filter element 10.

Additionally, the telescoping cage structure 68 can also limit movement of the filter media 18 in a direction generally perpendicular to the elongate axis 26 (best seen in FIG. 1). Limited movement in this direction can be helpful to maintain a desired cross-section of the internal volume 24 for fluid flow 20 movement through the filtration device. Furthermore, the telescoping cage structure 68 can limit or eliminate undesired filter media 18 movement during a pulse cleaning operation when jets of fluid (e.g., water, air, etc.) can impinge on the filter media 18 from the clean side 44. Equipment for the pulse cleaning operation is not shown in the figures. These described benefits of limited filter media 18 movement in a direction generally perpendicular to the elongate axis 26 also apply to the previously discussed examples of expanded metal used with the filter element 10. The described example of the filter element 10 including the telescoping cage structure 68 thus includes both a telescoping feature and an accordion-like movement feature of the filter media 18.

Figure 5:
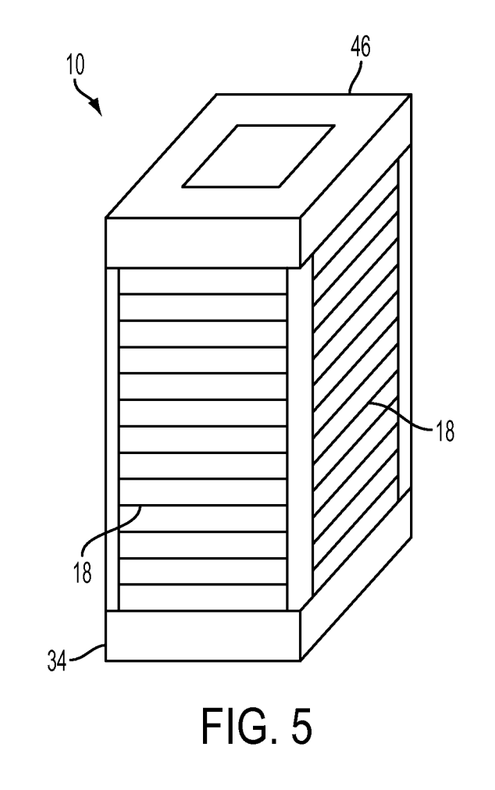
FIG. 5 is a schematized view of an example filter element including a rectangular cross-section in accordance with at least another aspect of the present invention.
Figure 6:
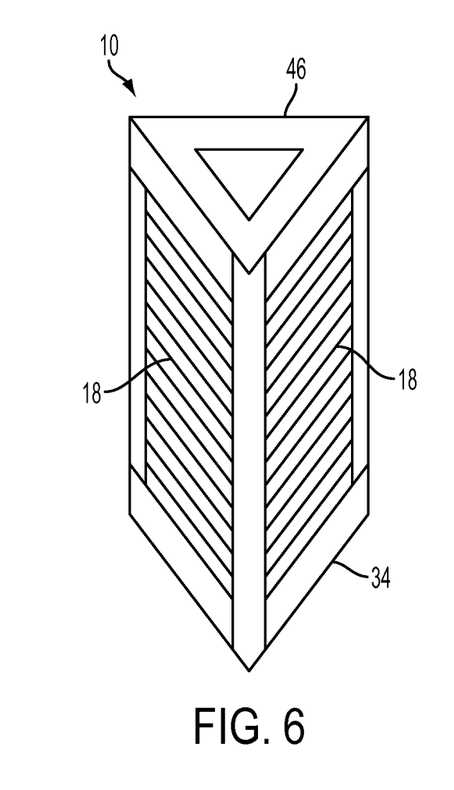
FIG. 6 is similar to FIG. 5, with the filter element including a triangular cross-section in accordance with at least another aspect of the present invention.

FIGS. 5 and 6 show other examples further variations that are within the scope of the present invention. Specifically, FIGS. 5 and 6 present examples of different shapes of filter element 10. FIG. 5 shows that the filter element 10 can be of rectangular cross-section shape. Of course rectangular cross-section shape also includes a square cross-section shape. FIG. 6 shows a triangular cross-section or prism shape of the filter element 10. These are merely example shapes, and many other shapes of filter element 10 are contemplated. In both the shown examples of FIGS. 5 and 6, the filter media 18 can be a single material piece forming each side of the pleat pack of the filter element 10. For example, the triangular prism-shaped filter element of FIG. 6 having three sections of filter media 18 (one for each side). In other examples, all of the sides of the respective filter elements can be formed by a single, unitary sheet of filter media 18.

It is also to be appreciated that for the multitude of different cross-section shapes that can be included in the filter element 10, each or any combination of the previously discussed aspects of the disclosure can be used with each of the possible cross-section shapes. For example, the square cross-section shaped filter element 10 of FIG. 5 can have a single or multiple pleat packs 12 including the radial pleat design for the filter media 18. Additionally, filter elements 10 having any cross-section shapes can include attachable support elements 48 to selectively place the filter element 10 in an elongated state. Each of the filter element shapes can include telescoping pleat packs 12. Also, each of the filter element shapes can include a telescoping cage structure 68.

Turning back to the radial pleat design, this configuration may be beneficial to the filtration operation by enabling a greater area of filter media 18 to be employed within the same envelope size of other filter elements. In one example, the radial pleat design could have an total filtration area governed by the equation: $A=(\pi/4)\times((OD)^2-(ID)^2)$ where A represents the total filtration area, OD represents the outside diameter of the radial pleat filter media 18, and ID represents the inside diameter of the radial pleat filter media 18. Assuming a particular, constant distance between the outside diameter filter pleats measured along the elongate axis 26, the radial pleat design filtration area can be calculated. In one example, the distance between the filter pleats as measured on the outside diameter is 0.1-inches. In comparison to filter elements including longitudinally pleated filter media, the radial pleat design filter element can increase the total filtration area in comparison to a longitudinal pleat design by about 29%. Should the designer choose to maintain the same total filtration area of the filter media 18 within a filtration operation such as an inlet filter house, the designer could reduce the envelope size of the radial pleat design filter element 10 while keeping the same total filtration area compared to filter elements including longitudinally pleated filter media. This can lead to further improvements such as reduced equipment sizes, for example, smaller inlet filter houses. However, it is to be appreciated that such an example may not provide the desired results and that such an example should not preclude other, possibly better examples.

Figure 7:
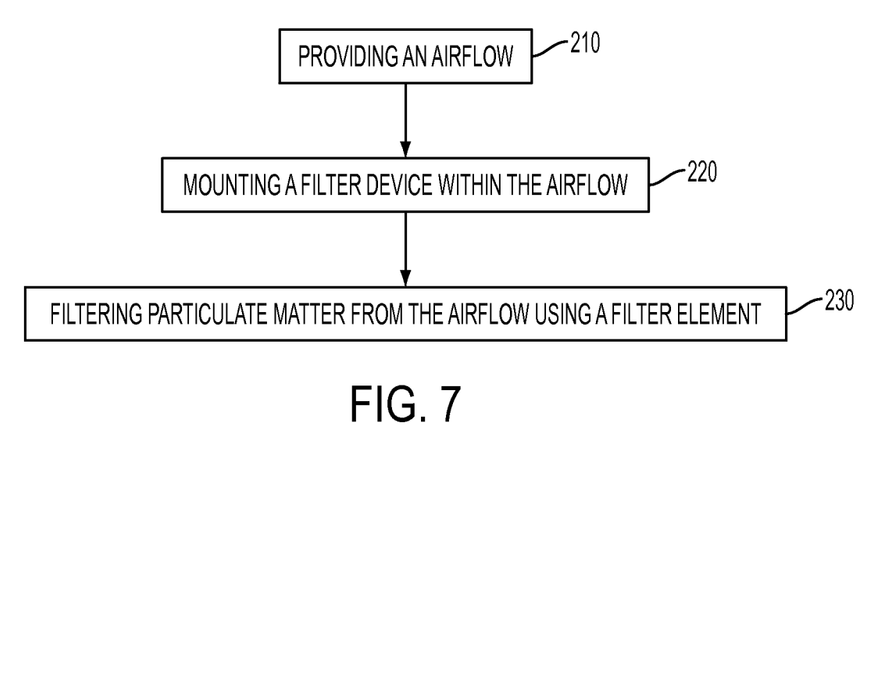
FIG. 7 is a top level flow diagram of an example method in accordance with at least another aspect of the present invention.

An example method of providing and using a filter element that filters a fluid flowing through the filter element is generally shown in FIG. 7. The shown method is thus part of an overall method of filtering an airflow. The method can be performed in connection with the examples of the filter elements 10 as shown in FIGS. 1-6. The method includes the step 210 of providing a fluid flow which is one example of an airflow 20. The airflow 20 can be proceeding to a turbine, such as a gas turbine.

The method further includes the step 220 of mounting the filter element 10 within the airflow 20. As was previously discussed, the filter element 10 includes a filter media 18 having an internal volume 24 formed at its interior. The internal volume 24 is configured to permit the airflow 20 through the filter media 18. The filter media 18 includes pleating in a direction transverse to the elongate axis 26 of the filter element 10. The filter element 10 also includes an end pan 34 located on a proximal end 36 of the filter element 10 and an end cap 46 located on the distal end 47 of the filter element 10. The filter element 10 is configured to be selectively positioned in a collapsed state and an elongated state. The end pan 34 is located at a first distance of length 50 from the end cap 46 in the collapsed state and the end pan 34 is located at a second distance of length 67 from the end cap 46 in the elongated state, the second distance being greater than the first distance.

The method further includes the step 230 of filtering particulate matter from the airflow 20 using the filter media 18 within the filter element 10. As previously discussed, the filter media 18 is configured to collect particulate material, including but not limited to dust, from the fluid (represented by arrows 20) flowing through the filter element 10. The filter media 18 can be formed from a variety of materials, such as fibers or a membrane. In one example, the filter media 18 is composed of a nonwoven porous synthetic material and cellulose. Additionally and/or alternatively, any combination of nonwoven porous synthetic materials and cellulose can be used, however, any suitable type of filter media 18 can be included.

Accordingly, within one specific example, a method provides a filter element that filters a fluid flowing through the filter element. The method includes providing a pleat pack to extend about an axis and to have an internal volume. The pleat pack includes a filter media for filtering particulate from the fluid. The step of providing the pleat pack includes folding the filter media to have pleats with the pleats extend out along planes that are transverse to the axis.

In the described examples, the methods and apparatus provide a filter element including filter media having a greater surface area in the same physical envelope size when compared to some possibly known filter elements including filter media pleated in a longitudinal direction. Furthermore, the described radial pleat design enables an improved release of particulate matter such as dust from the filter media due to the reduction of many physical barriers such as longitudinal filter media pleats that tend to trap the filtered particulate material. Additionally, the described examples of the filter element provide a filter element that can selectively be placed into a collapsed state. The collapsed state has a significantly smaller physical envelope size that can decrease required shipping space and required storage space for the filter elements. Both of these reductions can additionally reduce shipping and storage costs for the filter elements. Furthermore, due to the described surface-to-surface contact between the filter media and the end cap and end pan, a better seal between these elements is achieved with less sealant required when compared to other filter elements that include filter media pleated in a longitudinal direction.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A filter element for filtering a fluid flowing through the filter element, the filter element including:
   a pleat pack extending about an axis and having an internal volume, the pleat pack including a filter media for filtering out particulate from the fluid, the filter media being pleated, the pleats extending out along planes that are transverse to the axis; and
   at least one of an end pan and an end cap located at an end of the filter element, the filter media includes a last pleat adjacent to the at least one of an end pan and an end cap, the last pleat extending between a free end of the pleated material and a first fold, wherein at least a portion of a surface of the last pleat between the free end and the first fold lays in contact with the at least one of an end pan and an end cap in a face-to-face arrangement.

2. The filter element according to claim 1, wherein the filter media includes a last pleat at a fluid exit from the interior of the pleat pack, further including a sealant that secures the last pleat to the at least one of an end pan and an end cap.

3. The filter element according to claim 1, wherein the pleat pack has a variable length along the axis via an accordion-like movement of the filter media.

4. The filter element according to claim 3, wherein the pleat pack is configured to be selectively movable between a collapsed state and an elongated state.

5. The filter element according to claim 4, including an end pan located at one end of the filter element and an end cap located at another end of the filter element, the end pan located at a first distance from the end cap in the collapsed state and the end pan located at a second distance from the end cap in the elongated state.

6. A filter element for filtering a fluid flowing through the filter element, the filter element including:
   a pleat pack extending about an axis and having an internal volume, the pleat pack including a filter media for filtering out particulate from the fluid, the filter media being pleated, the pleats extending out along planes that are transverse to the axis;
   an end pan located at one end of the filter element and an end cap located at another end of the filter element;
   at least one extendible pole between the end pan and the cap, the at least one extendible pole having a variable length;
   wherein:
      the pleat pack has a variable length along the axis via an accordion-like movement of the filter media;
      the pleat pack is configured to be selectively movable between a collapsed state and an elongated state; and
      the end pan is located at a first distance from the end cap in the collapsed state and the end pan located at a second distance from the end cap in the elongated state.

7. A filter element for filtering a fluid flowing through the filter element, the filter element including:
   a pleat pack extending about an axis and having an internal volume, the pleat pack including a filter media for filtering out particulate from the fluid, the filter media being pleated, the pleats extending out along planes that are transverse to the axis;
   an end pan located at one end of the filter element and an end cap located at another end of the filter element;
   a telescoping cage structure between the end pan and the cap, the telescoping cage structure having a variable length;
   wherein:
      the pleat pack has a variable length along the axis via an accordion-like movement of the filter media;
      the pleat pack is configured to be selectively movable between a collapsed state and an elongated state; and
      the end pan is located at a first distance from the end cap in the collapsed state and the end pan located at a second distance from the end cap in the elongated state.

8. The filter element according to claim 1, including at least one support element configured to maintain a distance between the end pan and the end cap.

9. The filter element according to claim 6, wherein the pleat pack is a first pleat pack, the filter element further including a second pleat pack extending about the axis and having an internal volume, the second pleat pack including a filter media for filtering particulate from the fluid, the filter media being pleated, the pleats extend out along planes that are transverse to the axis.

10. The filter element according to claim 9, wherein the filter media of the first pleat pack includes a last pleat adjacent to the end pan, a surface of the last pleat of the filter media of the first pleat pack laying in contact with end pan in a face-to-face arrangement, the filter media of the second pleat pack includes a last pleat adjacent to the end cap, a surface of the last pleat of the filter media of the second pleat pack laying in contact with the end cap in a face-to-face arrangement.

11. The filter element according to claim 1, further including a second pleat pack extending about the axis and including a second filter media for filtering particulate from the fluid, the second filter media being pleated, the pleats extending along planes that are transverse to the axis, wherein the second pleat pack being disposed at least partially within the internal volume.

12. The filter element according to claim 1, wherein the media of the pleat pack has a circular cross-section configuration.

13. The filter element according to claim 1, wherein the media of the pleat pack has a quadrilateral cross-section configuration.

14. The filter element according to claim 1, wherein the media of the pleat pack has a triangular cross-section configuration.

15. The filter element according to claim 1 where the pleat spacing along the axis may be varied.

16. The filter element according to claim 1 where the pleat corrugation is varied.

17. A method of providing a filter element that filters a fluid flowing through the filter element, the method including:
providing a pleat pack to extend about an axis and to have an internal volume, the pleat pack including a filter media for filtering out particulate from the fluid, the step of providing the pleat pack including providing the filter media to have pleats with the pleats extend out along planes that are transverse to the axis;
providing at least one of an end pan and an end cap, locating the at least one of an end pan and an end cap at end of the filter element, the filter media includes a last pleat adjacent to the at least one of an end pan and an end cap, the last pleat extending between a free end of the pleated material and a first fold, wherein at least a portion of a surface of the last pleat between the free end and the first fold lays in contact with the at least one of an end pan and an end cap in a face-to-face arrangement.

18. The method according to claim 17, including providing a sealant that secures the last pleat to the at least one of an end pan and an end cap.

19. The method according to claim 17, wherein the step of providing the pleat pack includes providing the pleat pack to have a circular cross-section configuration.

20. The filter element according to claim 7, wherein the telescoping cage structure surrounds the pleat pack.

21. The filter element according to claim 1, wherein the portion of the surface of the last pleat lays in contact with the at least one of the end pan and the end cap in a plane transverse to the axis and wherein the portion of the surface of the last pleat completely surrounds the axis.

22. The method according to claim 17, wherein the portion of the surface of the last pleat lays in contact with the at least one of the end pan and the end cap in a plane transverse to the axis and wherein the portion of the surface of the last pleat completely surrounds the axis.

23. The filter element of claim 1, wherein the last pleat lays in contact with an interior surface of the at least one of an end pan and an end cap.

24. The method according to claim 17, wherein the last pleat lays in contact with an interior surface of the at least one of an end pan and an end cap.

25. The filter element of claim 1, wherein the entire surface of the last pleat lays in contact with the at least one of an end pan and an end cap.

26. The method according to claim 17, wherein the entire surface of the last pleat lays in contact with the at least one of an end pan and an end cap.

27. The filter element according to claim 1, wherein the surface of only the last pleat lays in contact with the at least one of an end pan and an end cap.

28. The method according to claim 17, wherein the surface of only the last pleat lays in contact with the at least one of an end pan and an end cap.

* * * * *